(12) United States Patent
Kim et al.

(10) Patent No.: US 11,869,395 B2
(45) Date of Patent: Jan. 9, 2024

(54) COLOR CALIBRATION DISPLAY APPARATUS, COLOR CALIBRATION DISPLAY METHOD, AND SWITCHABLE DISPLAY SYSTEM FOR PROVIDING VIRTUAL REALITY OR AUGMENTED REALITY USING COLOR CALIBRATION DISPLAY APPARATUS

(71) Applicant: POSTECH Research and Business Development Foundation, Pohang-si (KR)

(72) Inventors: Ji Hyung Kim, Cheonan-si (KR); Young Seok Kim, Seongnam-si (KR); Sungeun Park, Seoul (KR); Wook Sung Kim, Pohang-si (KR)

(73) Assignee: POSTECH Research and Business Development Foundation, Pohang-si (KR)

( * ) Notice: Subject to any disclaimer, the term of this patent is extended or adjusted under 35 U.S.C. 154(b) by 150 days.

(21) Appl. No.: 17/517,555

(22) Filed: Nov. 2, 2021

(65) Prior Publication Data
US 2022/0139279 A1  May 5, 2022

(30) Foreign Application Priority Data

Nov. 4, 2020 (KR) .................. 10-2020-0146413
Jul. 20, 2021 (KR) .................. 10-2021-0094782

(51) Int. Cl.
*G09G 3/00* (2006.01)
*G09G 3/34* (2006.01)
*G06T 7/90* (2017.01)

(52) U.S. Cl.
CPC .............. *G09G 3/006* (2013.01); *G06T 7/90* (2017.01); *G09G 3/001* (2013.01); *G09G 3/3413* (2013.01); *G09G 2320/0242* (2013.01); *G09G 2320/0666* (2013.01); *G09G 2320/0693* (2013.01); *G09G 2340/06* (2013.01); *G09G 2360/144* (2013.01)

(58) Field of Classification Search
CPC ...... G09G 3/006; G09G 3/001; G09G 3/3413; G09G 2320/0242; G09G 2320/0666; G09G 2320/0693; G09G 2340/06; G09G 2360/144; G09G 3/003; G09G 2320/0238; G09G 5/026; G06T 7/90
See application file for complete search history.

(56) References Cited

U.S. PATENT DOCUMENTS

| | | | |
|---|---|---|---|
| 10,331,207 B1* | 6/2019 | Simmons | H04N 13/383 |
| 11,025,892 B1* | 6/2021 | Aman | H04N 21/458 |
| 2013/0278631 A1* | 10/2013 | Border | G06Q 30/02 |
| | | | 345/633 |

(Continued)

FOREIGN PATENT DOCUMENTS

| | | |
|---|---|---|
| JP | 2005084121 A | 3/2005 |
| KR | 20140022237 A | 2/2014 |
| KR | 20200095985 A | 8/2020 |

*Primary Examiner* — Antonio Xavier

(57) ABSTRACT

A switchable display system for providing virtual reality or augmented reality using a color calibration display apparatus may comprise: an augmented reality data server configured to provide virtual reality and augmented reality information; and a color calibration display apparatus using a color calibration display module configured to perform color calibration according to ambient illuminance in a use environment.

19 Claims, 11 Drawing Sheets

(56) References Cited

U.S. PATENT DOCUMENTS

| | | | |
|---|---|---|---|
| 2014/0043354 A1 | 2/2014 | Choi et al. | |
| 2015/0277121 A1* | 10/2015 | Fridental | H04N 13/322 |
| | | | 348/54 |
| 2017/0090194 A1* | 3/2017 | Hayes | G02B 27/0101 |
| 2018/0204524 A1* | 7/2018 | Kucera | G09G 3/30 |
| 2020/0027201 A1* | 1/2020 | Chen | G06T 15/205 |
| 2022/0398986 A1* | 12/2022 | DeWall | G09G 3/32 |
| 2023/0079582 A1* | 3/2023 | Zhao | H04N 25/61 |

\* cited by examiner

<Bird's eye view>

<Side view>

Initial transparent state

Opaque state

COLOR CALIBRATION DISPLAY APPARATUS, COLOR CALIBRATION DISPLAY METHOD, AND SWITCHABLE DISPLAY SYSTEM FOR PROVIDING VIRTUAL REALITY OR AUGMENTED REALITY USING COLOR CALIBRATION DISPLAY APPARATUS

CROSS-REFERENCE TO RELATED APPLICATIONS

This application claims priority to Korean Patent Applications No. 10-2020-0146413 filed on Nov. 4, 2020 and No. 10-2021-0094782 filed on Jul. 20, 2021 with the Korean Intellectual Property Office (KIPO), the entire contents of which are hereby incorporated by reference.

BACKGROUND

1. Technical Field

Example embodiments relate to a color calibration display apparatus, a color calibration display method, and a switchable display system for providing virtual reality or augmented reality using the color calibration display apparatus, and more particularly, to a color calibration display apparatus which is mounted on a projection optical system of a switchable display system configured to perform a conversion between virtual reality and augmented reality and performs color calibration on an augmented reality display apparatus according to ambient illuminance in a use environment, a color calibration display method, and a switchable display system for providing virtual reality or augmented reality using the color calibration display apparatus.

2. Related Art

In general, augmented reality display apparatuses use a projection optical system to use an external environment as a background image.

The projection optical system has disadvantages in that a variation in color accuracy is large due to external lighting and a sharp decrease in color contrast occurs in a bright external environment. Accordingly, in the conventional augmented reality display apparatus using a projection optical system, there is a disadvantage in that emitted light is combined with illuminance in a surrounding environment which decreases color accuracy and color expression power, and there is a disadvantage in that it is difficult to express black, which decreases color contrast.

In order to solve the disadvantages of the projection optical system, in the conventional augmented reality display apparatus, a visor configured to block external light is used by being mounted on a front surface thereof through optical coating.

However, since a visor has fixed light reflectance, there is a disadvantage in that the visor cannot reflect a change in light transmittance according to changes in external environments such as time and place. Accordingly, the conventional augmented reality display apparatus equipped with a visor, when augmented reality is implemented, a sensation of immersion is decreased.

SUMMARY

Example embodiments of the present invention provide a color calibration display apparatus having high performance, high efficiency, and high reliability.

Example embodiments of the present invention also provide a color calibration display method having high performance, high efficiency, and high reliability.

Example embodiments of the present invention also provide a switchable display system having high performance, high efficiency, and high reliability.

According to an exemplary embodiment of the present disclosure for achieving the above-described objective, a switchable display system for providing virtual reality or augmented reality using a color calibration display apparatus may comprise: an augmented reality data server configured to provide virtual reality and augmented reality information; and a color calibration display apparatus using a color calibration display module configured to perform color calibration according to ambient illuminance in a use environment.

According to another exemplary embodiment of the present disclosure for achieving the above-described objective, a color calibration display apparatus may comprise: a frame which is in a form of a helmet or goggles having a frame structure through which light enters in a state of being worn on a head of a user; a display projector configured to output image light such that augmented reality image information is provided to the user on an optimized screen along with a transmitted and visible real world; a projection optical system installed to be attached to one side of the frame and configured to generate and transmit an output augmented reality image signal to the display projector; a controller configured to control brightness of an augmented reality image, which is viewed by being projected by the display projector, to be adjusted according to illuminance detected by an illuminance sensor; a power supply configured to supply power for augmented reality driving of the color calibration display apparatus; and a color calibration display module configured to, when the image light generated by the display projector is projected onto the projection optical system and reflected by the projection optical system to enter eyes of the user, change color in response to an adjustment of an amount of light incident from the outside to recognize the augmented reality image information.

The color calibration display module may further comprise the illuminance sensor mounted in front of the frame on an optical path of the projection optical system and provided as at least one sensor for detecting external illuminance.

The color calibration display apparatus may further comprise a switch unit installed at one side of the frame or formed in a separate device connected to the frame in a wired manner and configured to function as a switch for turning the power supply on/off.

The color calibration display apparatus may further comprise a microdisplay configured to, during the augmented reality driving, request augmented reality information processing with an image captured by a red-green-blue (RGB)-D camera in a line of sight of the user and geographic position information of a global positioning system (GPS) module.

The color calibration display apparatus may further comprise a communication unit which performs data communication for performing an augmented reality information request and receiving augmented reality corresponding thereto through an Internet connection with an external augmented reality data server and to which a communication method through which the Internet is accessible is applied.

The color calibration display apparatus may further comprise a microdisplay configured to provide the augmented reality image information to the display projector and receive augmented reality voice information from a voice signal output module.

Based on the color calibration display module, which changes color in response to an amount of ultraviolet light, and the illuminance detected by the illuminance sensor which detects external illuminance, the controller may control the augmented reality image information of the image light output through the display projector to be clearly provided to the user.

The controller may control a contrast value of the augmented reality image, which is viewed through the display projector, to be gradually adjusted according to an illuminance value detected by the illuminance sensor.

The controller may function to provide an optimized screen having optimized visibility simultaneously using a degree of a change in color of the color calibration display module, which changes color according to an amount of ultraviolet light, and an illuminance value detected by the illuminance sensor.

During the augmented reality driving of the color calibration display apparatus, the controller may request augmented reality image information corresponding to a user request for augmented reality information to an external augmented reality data server to receive and store the augmented reality image information in an internal memory, provide the augmented reality image information through the display projector, and execute an augmented reality application installed thereon.

The color calibration display module may be a lens component which is disposed in front of both eyes of the user wearing the frame and allows a real world to be transmitted and seen through a field of view of the user; and the color calibration display module may be provided as a see-through type transparent lens which changes color due to a molecular arrangement of a lens material being actively changed when exposed to ultraviolet light in an outdoor area.

The color calibration display module may be provided as photochromic glass in which transparency of a lens is changed step-by-step according to a preset amount of ultraviolet light and which includes a D-shine photochromic dye, which is a dye that changes color according to an amount of ultraviolet light.

The color calibration display module may be provided in a form of an active type lens in which a thin film made of a photochromic material is applied on glass made of a transparent material or plastic made of a polycarbonate material, or a photochromic substrate is inserted.

The illuminance sensor may detect and provide brightness of external light to the controller so that, when the controller provides the augmented reality image information, the illuminance sensor functions to allow the brightness of the external light to be used as auxiliary information for adjusting brightness of the augmented reality image.

According to yet another exemplary embodiment of the present disclosure for achieving the above-described objective, a color calibration display method may comprise: receiving a target color temperature for expressing a specific color of a projected image from a user; obtaining a color temperature for each color constituting the target color temperature using a color coordinate system; obtaining color temperature coordinates for each color using the color coordinate system; measuring illuminance for each color according to ambient external light using an illuminance sensor; obtaining color space coordinates corresponding to the color coordinate system from the illuminance for each color using a color matching function; comparing the color temperature coordinates and the color space coordinates for each color to calculate a color calibration value; and reflecting the color calibration value in the illuminance for each color to calibrate a color temperature disproportionately expressed due to external light so as to be uniformly expressed.

The obtaining of the color temperature for each color constituting the target color temperature using the color coordinate system may include measuring, by a color calibration display module, a color temperature value corresponding to a measured illuminance value for each color based on a CIE 1931-based color coordinate system.

The color coordinate system may refer to a coordinate graph in which, based on information about color perception of humans, a color expression power of a display apparatus is expressed as a Maxwell's color triangle using a tristimulus value, a color matching function, and a chromaticity distribution table.

The color calibration display method may use an inverse-super twisted nematic (STN) guest-host liquid crystal method which is a method in which characteristics of a display vary according to a doping concentration of a dichroic dye, in order for a color calibration display module which is a secondary display whose transmittance is variable according to an applied voltage.

The color calibration display method may use a method in which, in an initial state without an applied voltage, a liquid crystal and a dichroic dye are aligned in a vertical direction to maintain a transparent state in which light is transmitted without any change, and light incident from an external light source is decreased using an opening/closing rate of a display being lowered due to rotation of an orientation state of the liquid crystal and the dichroic dye when a voltage is applied up to a driving voltage.

According to the present invention, it is possible to provide an apparatus for adjusting color calibration illuminance and color temperature in order to solve a color accuracy problem of a display of an existing projection optical system for AR.

According to the present invention, it is possible to provide an apparatus capable of constantly maintaining a color temperature desired by a user through an illuminance sensor combined with a color filter.

According to the present invention, it is possible to provide an improved projection optical system for AR to which a secondary display is coupled.

According to the present invention, it is possible to provide optimal display performance with improved color expression suitable for a current display environment using a secondary display whose transmittance is adjustable.

According to the present invention, it is possible to implement a new integrated display capable of switching between virtual reality and AR by maximizing transmittance and an opening/closing rate of a secondary display.

According to the present invention, it is possible to maintain constant color expression by compensating for a color imbalance of a display, which is degraded by external light, through a color temperature calibration algorithm.

The present invention can be applied to existing products through the development of a detachable secondary display.

According to the present invention, by using a software compensation device, the application of additional technologies and supplementation are easy.

DETAILED DESCRIPTION OF THE EMBODIMENTS

Figure 1:
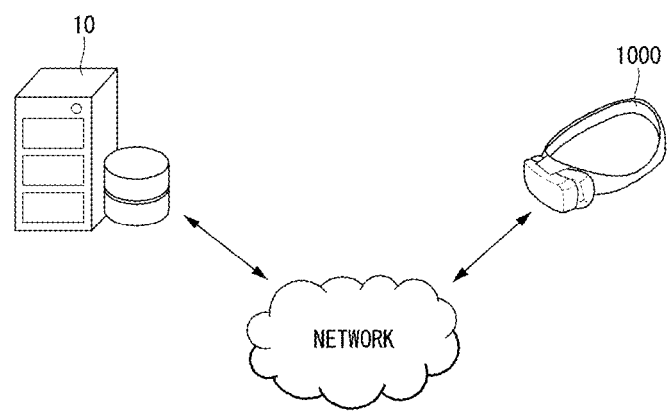
FIG. 1 is a configuration diagram of a switchable display system for providing virtual reality or augmented reality (AR) according to an example embodiment of the present invention.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a configuration diagram of a switchable display system for providing virtual reality or augmented reality (AR) according to an example embodiment of the present invention.

Referring to FIG. 1, a switchable display system S according to the example embodiment of the present invention may be a system which includes an AR data server 10 and a color calibration display apparatus 1000 and switches between and provides virtual reality or AR according to switching thereof.

The AR data server 10 provides AR image information corresponding to a user request for AR information to the color calibration display apparatus 1000.

During AR driving, the color calibration display apparatus 1000 may request the AR image information corresponding to the user request for AR information to the AR data server 10 and may receive and store the AR image information in an internal memory. The color calibration display apparatus 1000 may serve to provide the corresponding AR image information through a display projector 1400, and an AR application may be executed by being installed thereon.

Figure 2:
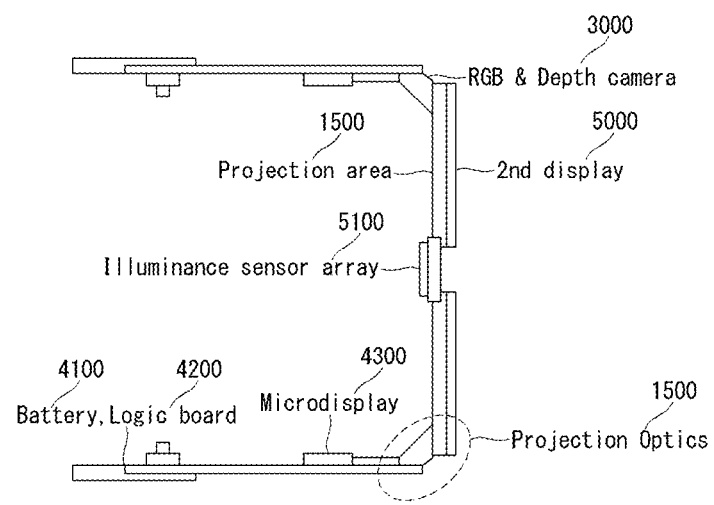
FIG. 2 is a configuration diagram of the color calibration display apparatus 1000 of the switchable display system according to the example embodiment of the present invention.

FIG. 2 is a configuration diagram of the color calibration display apparatus 1000 of the switchable display system according to the example embodiment of the present invention.

Referring to FIG. 2, the switchable display system S may be a system which switches between and provides virtual reality or AR according to switching thereof.

In the switchable display system S, a color calibration display module 5000 may be mounted on the display projector 1400 of the color calibration display apparatus 1000.

The color calibration display apparatus 1000 may provide an AR image. More specifically, the color calibration display apparatus 1000 may include a projection optical system 1500. Accordingly, the color calibration display apparatus 1000 may project the AR image onto an external environment through the projection optical system 1500.

The color calibration display apparatus 1000 according to one example embodiment of the present invention may include a frame 1100, the display projector 1400, a microdisplay 4300, a controller 4200, a power supply 4100, and the color calibration display module 5000.

The frame 1100 is a frame component of the color calibration display apparatus 1000 which is wearable on the head of a user. The frame 1100 may be formed in the form of a helmet or goggles having a frame structure through which light can enter in a state of being worn on the head of the user.

The display projector 1400 is a component which outputs image light such that AR image information may be provided to the user on an optimized screen along with the real world transmitted and seen through the color calibration display module 5000. When the image light generated by the display projector 1400 is projected onto the projection optical system 1500 and reflected by the projection optical system 1500 to enter eyes of the user, the display projector 1400 may function to allow AR image information to be well recognized when the color calibration display module 5000 adjusts an amount of light incident from the outside (real world) to change color. Here, the color calibration display module 5000 changes color according to an amount of light incident from the outside to function to allow AR information of image light of the display projector 1400 to be clearly recognized by the eyes of the user. In addition, it may be understood that the projection optical system 1500 may be disposed or positioned to be attached onto a central portion inside the color calibration display module 5000, and the display projector 1400 may be installed to be attached to a side surface of the frame so as to project image light onto the projection optical system 1500.

The controller 4200 is a component which generates an AR image signal to be output from the display projector 1400 to transmit the generated AR image signal to the display projector 1400 and controls the brightness of an AR image, which is viewed by being projected by the display projector 1400, to be adjusted according to illuminance detected by an illuminance sensor 5100. Based on the color calibration display module 5000, which changes color in response to an amount of ultraviolet light, and illuminance detected by the illuminance sensor 5100 which detects external illuminance, the controller 4200 may control AR image information of image light output through the display projector 1400 so as to be clearly provided to the user. Here, the controller 4200 may control a contrast value of an AR image, which is viewed through the display projector 1400, to be gradually adjusted according to an illuminance value detected by the illuminance sensor 5100. That is, the controller 4200 may function to provide an optimized screen with excellent visibility simultaneously using a degree of change in color of the color calibration display module 5000, which changes color according to an amount of ultraviolet light, and an illuminance value detected by the illuminance sensor 5100.

During AR driving, the microdisplay 4300 may request AR information processing with an image captured by a red-green-blue (RGB)-D camera 3000 in a line of sight of a user and geographic position information of a global positioning system (GPS) module.

The color calibration display module 5000 is a lens component which is disposed in front of both eyes of a user wearing the frame 1100 and allows the real world to be transmitted and seen through a field of view of the user. The color calibration display module 5000 includes the illuminance sensor 5100.

The color calibration display module 5000 may be provided as a see-through type transparent lens which changes color due to a molecular arrangement of a lens material being actively changed when exposed to ultraviolet light in an outdoor area.

In addition, the color calibration display module 5000 may change to a dark color in a bright outdoor area having a large amount of ultraviolet light and may change to a transparent color in a dark indoor area having a small amount of ultraviolet light.

Furthermore, in the color calibration display module 5000, the transparency of the lens may be gradually changed according to a preset amount of ultraviolet light.

In addition, the color calibration display module 5000 may be provided as a photochromic glass which changes color according to an amount of ultraviolet light and may be implemented to include a D-shine photochromic dye which is a dye that changes color according to an amount of ultraviolet light.

In addition, the color calibration display module 5000 may be provided as an active type lens and may be implemented in the form in which a thin film made of a photochromic material is applied on glass made of a transparent material or plastic made of a polycarbonate material, or a photochromic substrate is inserted.

The illuminance sensor 5100 is installed in front of the frame 1100 and is a sensor component for detecting external illuminance. The illuminance sensor 5100 detects and provides the brightness of external light to the controller 4200, and thus, when the controller 4200 provides AR image information, the illuminance sensor 5100 functions to allow the brightness of the external light to be used as auxiliary information for adjusting the brightness of an AR image.

The color calibration display apparatus 1000 may further include a switch unit which turns the power supply 4100 on or off, the microdisplay 4300 which includes the GPS module and the RGB-D camera 3000 which provide geographic position information and image information for requesting AR information, and a communication unit which performs data communication to transmit AR event information of the microdisplay 4300 to an external AR data server 10 under control of the controller 4200 and to receive corresponding AR information.

The switch unit may include a switch for turning the power supply 4100 on/off installed at one side of the frame 1100 or may be formed in a separate device connected to the frame 1100 in a wired manner.

The communication unit may perform data communication capable of performing an AR information request and receiving AR information corresponding thereto through a network connection with the external AR data server 10. Here, it may be understood that various communication methods including 3G/4G communication and long-term evolution (LTE), through which the Internet is accessible, are applied to the communication unit.

The microdisplay 4300 may further include a voice signal output module which outputs AR voice information corresponding to AR image information provided through the display projector 1400, and the voice signal output module may include a microphone, a speaker, or the like disposed on the frame 1100.

Figure 3:
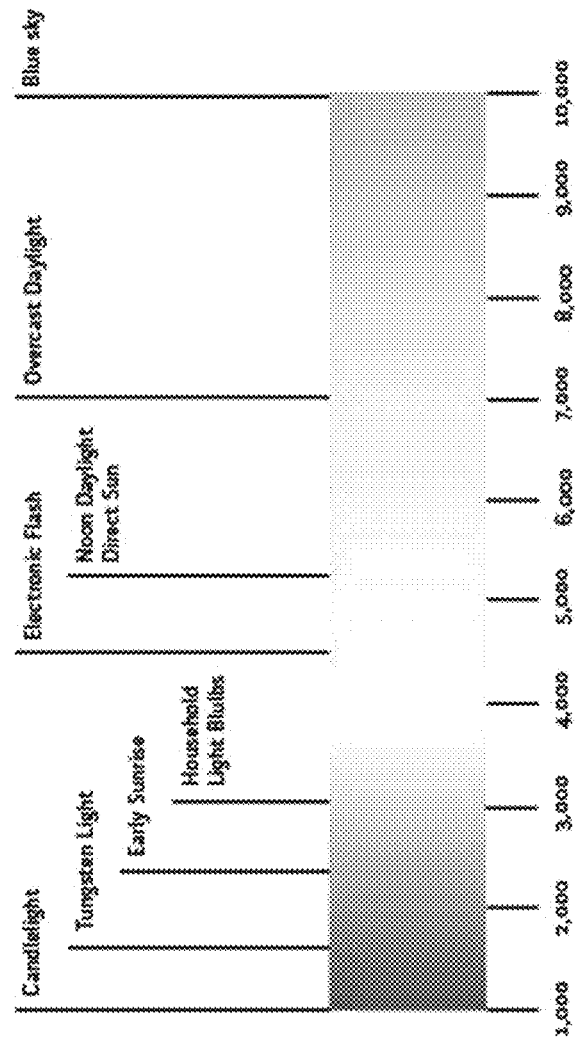
FIG. 3 is a graph showing a standard color temperature according to an external environment according to an example embodiment of the present invention.

FIG. 3 is a graph showing a standard color temperature according to an external environment according to an example embodiment of the present invention.

Referring to FIG. 3, the color calibration display apparatus 1000 may emit light with a certain color temperature when an AR image is projected. The color calibration display apparatus 1000 according to one example embodiment of the present invention may correspond to a conventionally well-known AR-based display apparatus. Here, a color temperature may be generally set based on measurement data in a darkroom. Table 1 is a table in which luminance of the color calibration display apparatus according to external light is measured and summarized according to the example embodiment of the present invention. According to example embodiments, the color calibration display apparatus 1000 may emit light with a temperature of 6,500 K.

TABLE 1

| Condition | Illumination | |
|---|---|---|
| | (ftcd) | (lux) |
| Sunlight | 10,000 | 107,527 |
| Full Daylight | 1,000 | 10,752 |
| Overcast Day | 100 | 1,075 |
| Very Dark Day | 10 | 107 |
| Twilight | 1 | 10.8 |
| Deep Twilight | .1 | 1.08 |
| Full Moon | .01 | .108 |
| Quarter Moon | .001 | .0108 |
| Starlight | .0001 | .0011 |
| Overcast Night | .00001 | .0001 |

In this case, an AR image projected from the color calibration display apparatus 1000 may be affected by external light. Accordingly, in the switchable display system S according to the example embodiment of the present invention, color calibration of an AR image emitted from the color calibration display apparatus 1000 may be performed using the color calibration display module 5000 including the illuminance sensor 5100. Color calibration using the illuminance sensor 5100 will be described in more detail when the color calibration display module 5000 will be described below.

Figure 4A:
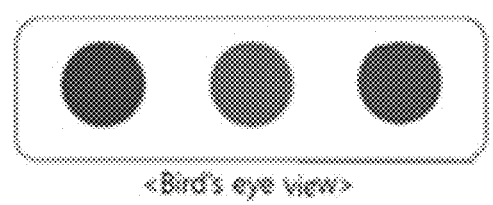
FIGS. 4(a) and 4(b) show conceptual diagrams for describing the structures of an illuminance sensor 5100 and a color filter 5200 according to an example embodiment of the present invention.
Figure 4B:
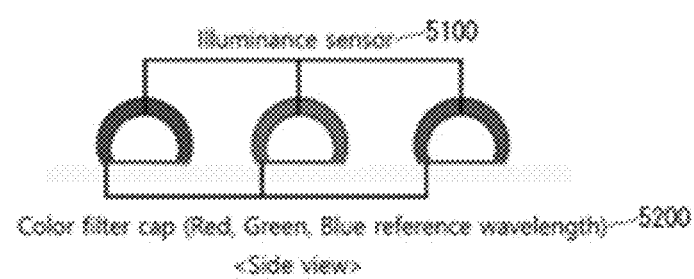

FIGS. 4(a) and 4(b) show conceptual diagrams for describing the structures of an illuminance sensor 5100 and a color filter 5200 according to an example embodiment of the present invention.

Referring to FIGS. 4(a) and 4(b), a color calibration display module 5000 may be positioned at a front side of a color calibration display apparatus 1000. More specifically, the color calibration display module 5000 may be positioned at one side of a projection optical system 1500. Accordingly, the color calibration display module 5000 may perform color calibration on an image projected from the projection optical system 1500 in the color calibration display apparatus 1000.

The color calibration display module 5000 may perform color calibration on an image projected from the color calibration display apparatus 1000 in consideration of illuminance in a surrounding environment. The color calibration display module 5000 may include the illuminance sensor 5100 including the color filter 5200.

According to example embodiments, the illuminance sensor 5100 may be provided in the form of an illuminance sensor array on which a color filter is deposited. In other words, the illuminance sensor 5100 may include the color filter 5200 allowing specified R, G, and B wavelength bands to pass therethrough, thereby measuring luminance for each color. Accordingly, the color calibration display module 5000 may calibrate a color of a projected image using measured illuminance information for each color and the CIE-based coordinate system. Color calibration of the color calibration display module 5000 will be described in more detail with reference to FIG. 5 below.

Figure 5:
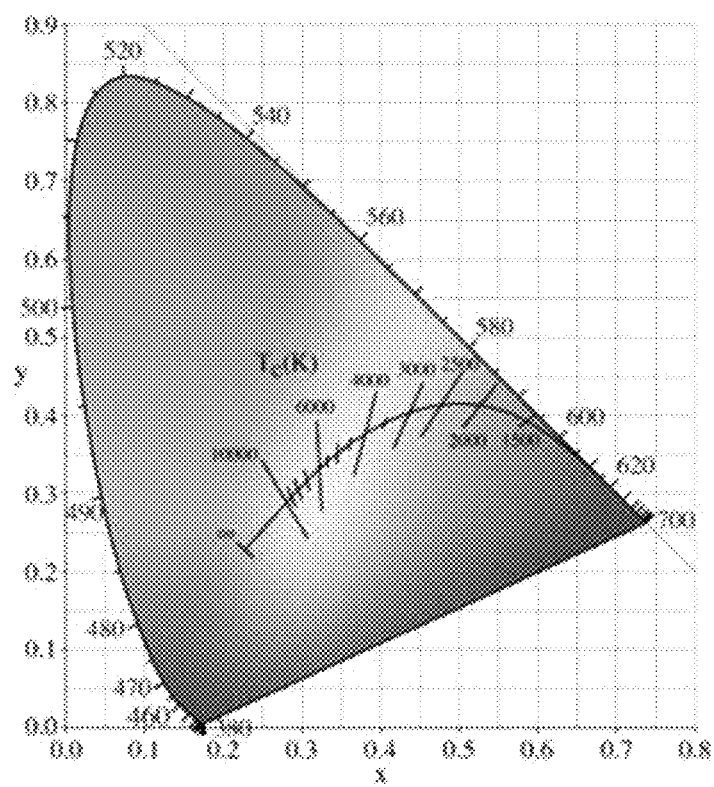
FIG. 5 is a graph showing CIE 1931-based color coordinates for each color temperature according to an example embodiment of the present invention.

FIG. 5 is a graph showing CIE 1931-based color coordinates for each color temperature according to an example embodiment of the present invention.

Referring to FIG. 5, as described above, a color calibration display module 5000 may perform color calibration on a projected image based on illuminance information for each color obtained by an illuminance sensor 5100.

According to example embodiments, the color calibration display module 5000 may measure a color temperature value corresponding to a measured illuminance value for each color based on a CIE 1931-based color coordinate system.

Here, the color coordinate system may refer to a coordinate graph in which, based on information about color perception of humans, a color expression power of a display apparatus is expressed as a Maxwell's color triangle using a tristimulus value, a color matching function, and a chromaticity distribution table.

The color calibration display module 5000 may receive a target color temperature for expressing a specific color of a projected image from a user based on a target color temperature input in advance from the user (S1000). Here, the color temperature may be a temperature value of light due to complete heat radiation.

Next, a processor 110 may obtain a color temperature for each color constituting the target color temperature using the color coordinate system (S2000). Color temperature coordinates for each color may be obtained using the Maxwell's color triangle of the CIE 1931-based color coordinate system.

Thereafter, the processor 110 may measure illuminance for each color according to ambient external light using an illuminance sensor including a color filter (S3000).

Subsequently, the processor 110 may obtain color space coordinates corresponding to the color coordinate system from the illuminance for each color using the color matching function (S4000).

Thereafter, the processor 110 may compare the color temperature coordinates and the color space coordinates for each color to calculate a color calibration value (S5000).

Accordingly, the processor 110 may reflect the color calibration value in the illuminance for each color (S6000) to calibrate a color temperature disproportionately expressed due to external light so as to be uniformly expressed.

An operation of a color calibration display apparatus for improving color expressivity of the color calibration display apparatus will be described in more detail when a color calibration method using a color calibration display apparatus is described below.

Figure 6:
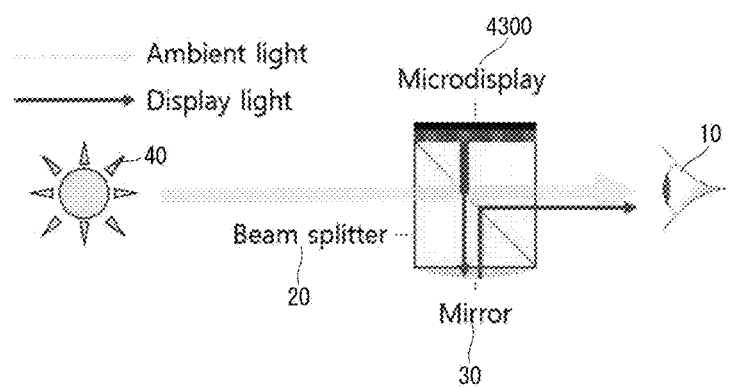
FIG. 6 is a conceptual diagram of a microdisplay 4300 for describing an image information transmission process of a projection optical system 1500.
Figure 7:
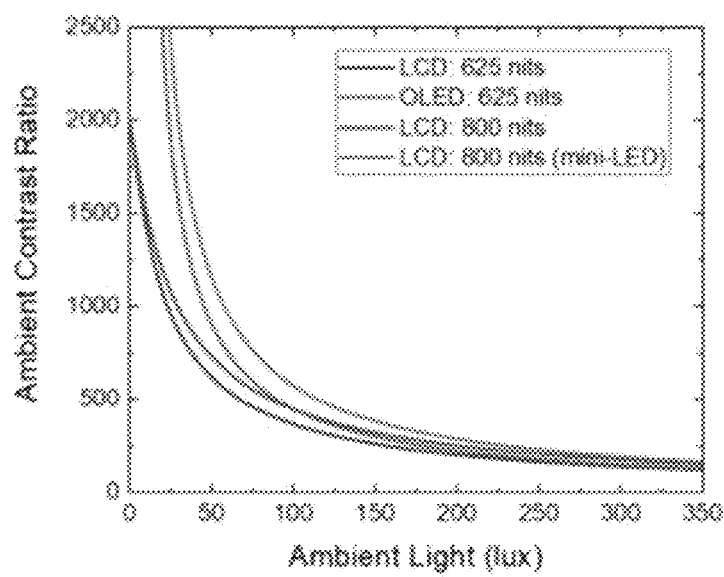
FIG. 7 is a graph showing a reduction in ambient contrast ratio (ACR) according to external light.

FIG. 6 is a conceptual diagram of a microdisplay 4300 for describing an image information transmission process of a projection optical system 1500, and FIG. 7 is a graph showing a reduction in ambient contrast ratio (ACR) according to external light.

Referring to FIGS. 6 and 7, in a switchable display apparatus 1000 according to an example embodiment of the present invention, a color temperature of the switchable display apparatus 1000 is controlled in consideration of illuminance of an external environment, thereby providing a highly visible virtual reality or AR image implemented with a color temperature and a color contrast value which are preset by a user. A projection optical system 1500 is provided as an optical system including a beam splitter 20 and a mirror 30, and a user 10 combines and recognizes information provided through the projection optical system 1500 from a light source 40 in an external environment and AR information provided from a microdisplay 4300.

Here, in a conventional display apparatus, a color temperature is specified as a constant temperature. For example, conventionally, since a constant color temperature of 6,500 K has been specified and provided to the user 10, the user 10 performed color calibration by adjusting the white balance.

A color temperature specified in a display is based on measurement data in a darkroom, but in an environment using an AR display, since an image, in which a color temperature of a display generated through a projection optical system is combined with light generated by an external environment, is input, as compared with a mobile display or a large display, the influence of external light is greater, which causes a large change.

A specified color temperature is a value calculated based on measurement data in a darkroom. In a display apparatus that projects an image to an external environment, since an intrinsic color temperature of the display apparatus is combined with illuminance in the external environment, the visibility of the user 10 is reduced due to the interference of external light.

In general, a color temperature used in an AR display using a transmissive optical system is specified as 6,500 K, and the user 10 may directly customize the white balance of a display to adjust the display having a desired color.

Color contrast specified in a display is based on measurement data in a darkroom, but in an environment using an AR display, because an image, in which light (display light) generated through the projection optical system 1500 is combined with light (ambient light) generated by an external environment of a display, is input, even when relatively small luminance, of which a dynamic range is large according to an external environment, occurs, color contrast of an image is considerably lowered, which is a factor that causes a decrease in color accuracy.

An ACR calculating method uses a method of adding ambient luminance to each term of a white luminance value/block luminance value, which is an existing color contrast calculating method, and in order to distinguish colors of a display, it is necessary to secure a color contrast of at least 1:5.

Accordingly, in the present invention, through a color calibration display module 5000 which is a secondary display whose transmittance is adjustable, the color contrast of a display corresponding to an external environment can be secured based on an illuminance value for an external light source, which is measured from an illuminance sensor 5100.

Figures 8A, 8B:
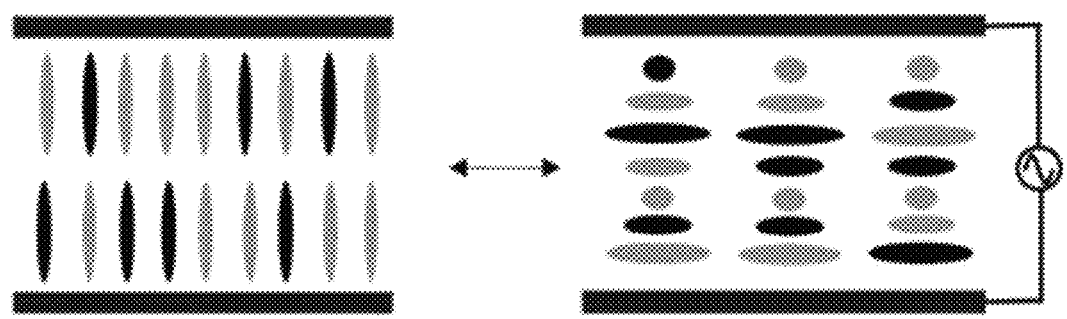
FIGS. 8(a) and 8(b) provide graphs showing an operation method of a color calibration display module 5000 which is a transmittance-variable secondary display using an inverse-super twisted nematic (STN) guest-host liquid crystal method according to an example embodiment of the present invention.

FIGS. 8(*a*) and 8(*b*) provide graphs showing an operation method of a color calibration display module 5000 which is a transmittance-variable secondary display using an inverse-super twisted nematic (STN) guest-host liquid crystal method according to an example embodiment of the present invention.

Referring to FIGS. 8(*a*) and 8(*b*), in order to configure the color calibration display module 5000 which is a secondary display whose transmittance is variable according to an applied voltage, a guest-host liquid crystal method using an inverse-STN structure, which is a method in which characteristics of a display vary according to a doping concentration of a dichroic dye, is used.

In the present invention, a method is used in which, in an initial state without an applied voltage, a liquid crystal and a dichroic dye are aligned in a vertical direction to maintain a transparent state in which light is transmitted without any change, and light incident from an external light source is decreased using the fact that an opening/closing rate of a display is lowered due to the rotation of an orientation state of the liquid crystal and the dichroic dye when a voltage is applied up to a driving voltage.

Figure 9A:
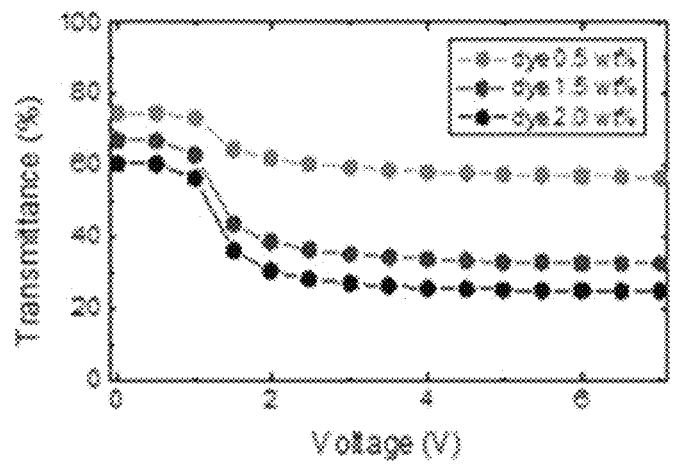
FIGS. 9(a) and 9(b) provide graphs showing the performance of a color calibration display module 5000 which is a transmittance-variable secondary display using an inverse-STN guest-host liquid crystal method according to an example embodiment of the present invention.
Figure 9B:
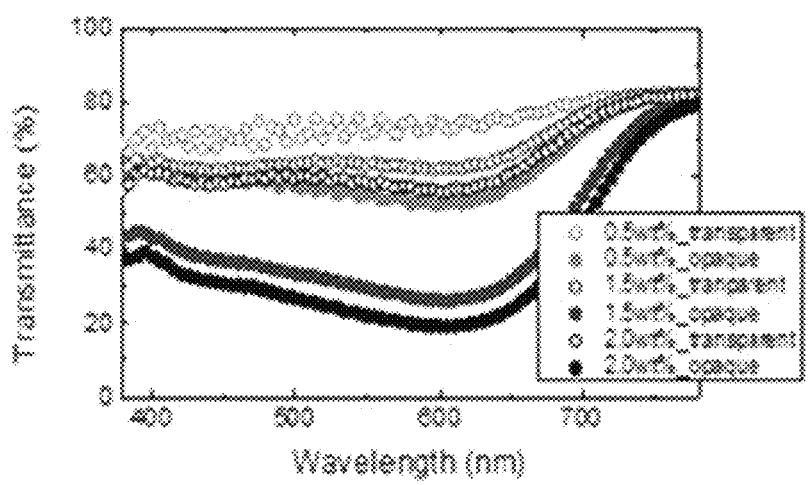

FIGS. 9(*a*) and 9(*b*) show graphs showing the performance of a color calibration display module 5000 which is a transmittance-variable secondary display using an inverse-STN guest-host liquid crystal method according to an example embodiment of the present invention.

Referring to FIGS. 9(*a*) and 9(*b*), graphs showing results in which the transmittance of the inverse-STN guest-host liquid crystal method of the color calibration display module 5000 is changed according a voltage (see FIG. 9(*a*)) and is changed according to a wavelength (see FIG. 9(*a*)) are presented.

Figures 10A, 10B, 10C:
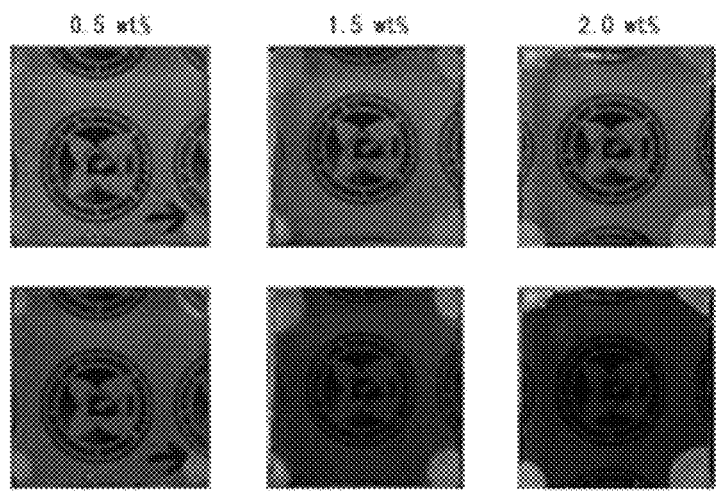
FIGS. 10(a), 10(b) and 10(c) show experimental result images of a color calibration display module 5000, which is a transmittance-variable secondary display, according to a change in doping concentration of a dichroic dye.

FIGS. 10(*a*), 10(*b*) and 10(*c*) show experimental result images of a color calibration display module 5000, which is a transmittance-variable secondary display, according to a change in doping concentration of a dichroic dye.

Referring to FIGS. 10(*a*), 10(*b*) and 10(*c*), the present invention provides a virtual reality/AR-switchable display structure which is capable of sequentially increasing an ACR of a display as shown in FIGS. 10(*a*), 10(*b*), and 10(*c*) through a method of reducing external light which is the biggest factor that lowers an ACR and is capable of implementing a virtual reality environment by completely blocking light incident from a front surface through a method of reducing an opening/closing rate to a minimum by maximizing a doping concentration of a dichroic dye using a feature capable of changing an amount of transmittance according to the doping concentration of the dichroic dye.

Figure 11:
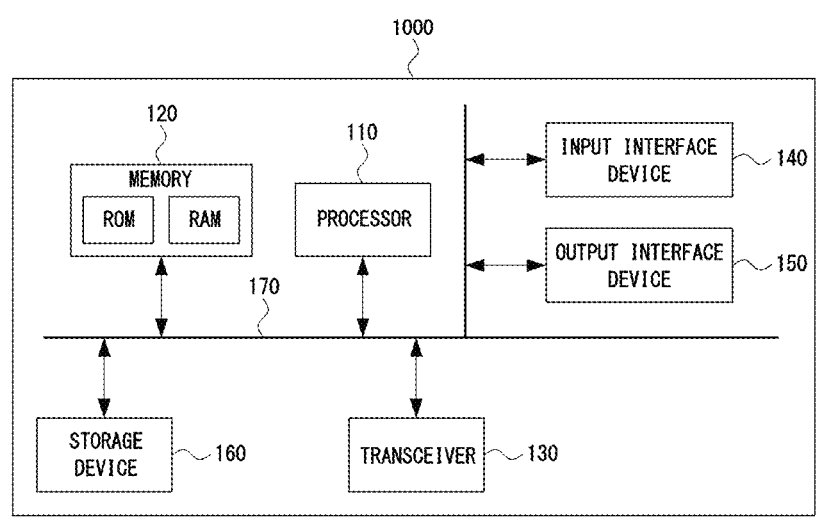
FIG. 11 is a block diagram for describing operating hardware components of a color calibration display apparatus 1000 of a switchable display system S according to an example embodiment of the present invention.

FIG. 11 is a block diagram for describing operating hardware components of a color calibration display apparatus 1000 of a switchable display system S according to an example embodiment of the present invention.

Referring to FIG. 11, the color calibration display apparatus 1000 may include a memory 100 which stores one or more commands and a processor 110 which executes the one or more commands of the memory 100.

The memory 100 in the color calibration display apparatus 1000 may include at least one of a volatile storage medium and a non-volatile storage medium. For example, the memory 100 may include at least one of a read only memory (ROM) and a random access memory (RAM).

The memory 100 may include the one or more commands to be executed by the processor 110 to be described below.

According to example embodiments, the one or more commands may include a command for receiving a target color temperature for expressing a certain color of a projected image from a user (S100), a command for obtaining color temperature coordinates for each color constituting the target color temperature using a color coordinate system (S200), a command for measuring illuminance for each color according to ambient external light using an illuminance sensor including a color filter (S300), a command for obtaining color space coordinates from the illuminance for each color using a color matching function (S400), a command for comparing the color temperature coordinates and the color space coordinates for each color to calculate a color calibration value (S500), and a command for reflecting the color calibration value in the illuminance for each color to calibrate a color temperature disproportionately expressed by external light so as to be uniformly expressed (S600).

The processor 110 may refer to a central processing unit (CPU), a graphics processing unit (GPU), or a dedicated processor in which methods according to example embodiments of the present invention are performed.

As described above, the processor 110 may execute one or more program commands stored in the memory 100.

The color calibration display apparatus 1000, the color calibration display module 5000, and the switchable display system S including the color calibration display apparatus 1000 according to example embodiments of the present invention have been described.

Hereinafter, a color calibration display method will be described according to a processor 110 of a color calibration display apparatus 1000.

Figure 12:
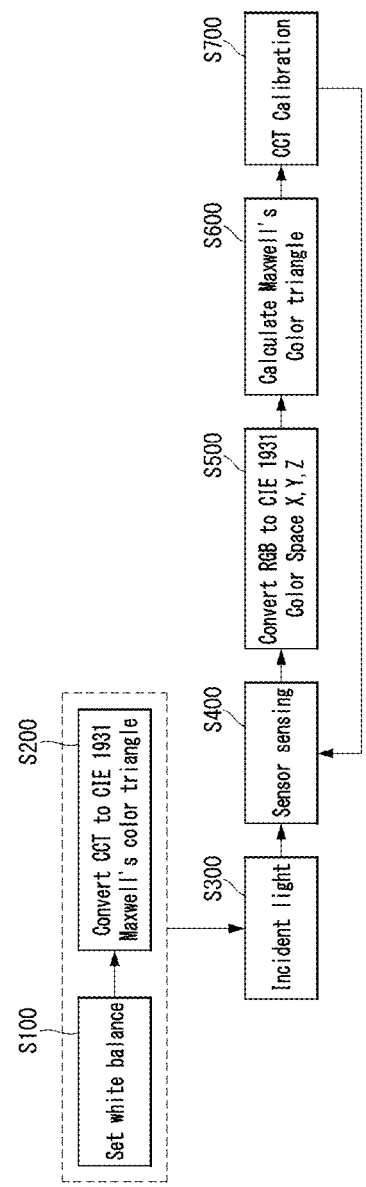
FIG. 12 is a conceptual diagram for describing a color calibration method using a color calibration display apparatus 1000 according to an example embodiment of the present invention.

FIG. 12 is a conceptual diagram for describing a color calibration method using a color calibration display apparatus 1000 according to an example embodiment of the present invention.

Referring to FIG. 12, a block flow diagram for describing an algorithm of the color calibration display apparatus 1000 based on illuminance sensor measurement data using a Maxwell's color triangle-based color shift of a color calibration display method according to an example embodiment of the present invention is shown.

In the color calibration method using the color calibration display apparatus according to the example embodiment of the present invention, a processor 110 of the color calibration display apparatus 1000 executes commands of S100 to S700.

An initial state corresponds to a command for setting white balance (S100) and a command for converting a correlated color temperature (CCT) to a CIE 1931 Maxwell's color triangle (S200).

First, the processor 110 performs the command for setting the white balance (S100).

Thereafter, the processor 110 performs the command for converting the CCT to the CIE 1931 Maxwell's color triangle (S200).

The processor 110 performs an incident light command (S300).

The processor 110 performs a sensor sensing command (S400).

The processor 110 performs a command for converting RGB to CIE 1931 color space X, Y, Z (S500).

Thereafter, the processor 110 performs a command for calculating the Maxwell's color triangle (S600).

The processor 110 performs a CCT calibration command (S700).

When a color temperature is not uniformly expressed, the processor 110 repeatedly performs the commands of S300 to S600 to calibrate a color temperature disproportionately expressed by external light so as to be uniformly expressed.

Figure 13:
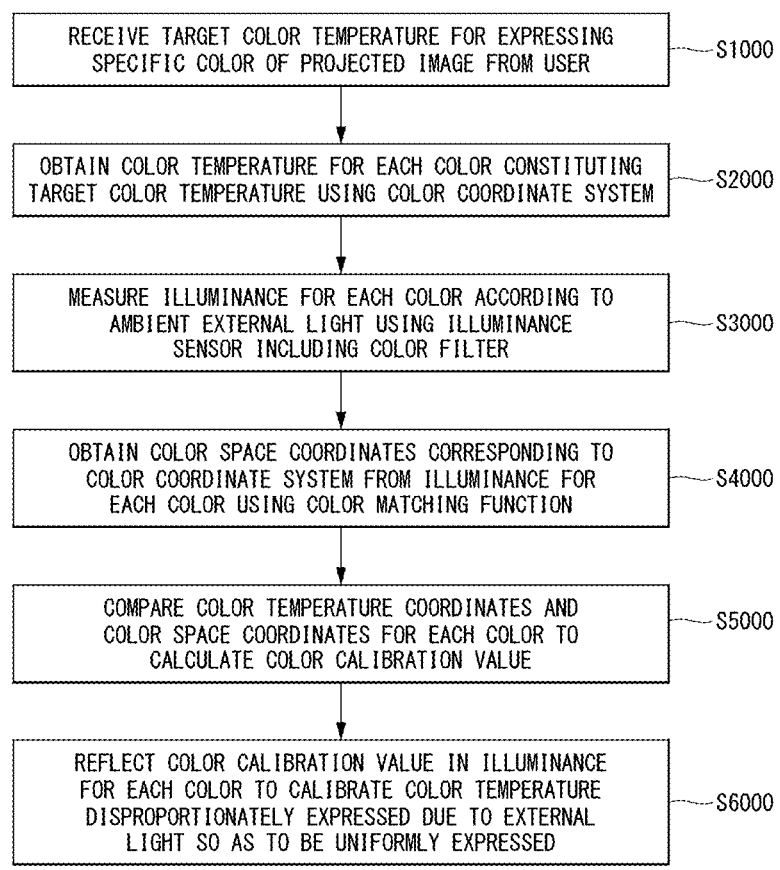
FIG. 13 is a flowchart for describing a color calibration display method using a color calibration display apparatus 1000 according to an example embodiment of the present invention.

FIG. 13 is a flowchart for describing a color calibration display method using a color calibration display apparatus 1000 according to an example embodiment of the present invention.

Referring to FIG. 13, in operation S1000, a processor 110 in the color calibration display apparatus 1000 receives a target color temperature for expressing a specific color of a projected image from a user. Here, the color temperature may be a temperature value of light due to complete heat radiation.

In operation S2000, after operation S1000, the processor 110 obtains a color temperature for each color constituting the target color temperature using a color coordinate system. According to example embodiments, the processor 110 may obtain color temperature coordinates for each color using a Maxwell's color triangle of a CIE 1931 color coordinate system.

In operation S3000, when light is incident (operation S2500), the processor 110 measures illuminance for each color according to ambient external light using an illuminance sensor including a color filter.

In operation S4000, after operation S300, the processor 110 obtains color space coordinates corresponding to the color coordinate system from the illuminance for each color using a color matching function.

In operation S500, after operation S400, the processor 110 compares the color temperature coordinates and the color space coordinates for each color to calculate a color calibration value.

In operation S6000, after operation S5000, the processor 110 reflects the color calibration value in the illuminance for each color. Accordingly, the processor 110 may calibrate a color temperature disproportionately expressed by external light so as to be uniformly expressed.

When a color temperature is not uniformly expressed after operation S6000 is performed, operations S3000 to S6000 are repeated.

The color calibration display apparatus, the color calibration display method using the same, and the switchable display system including the color calibration display apparatus according to the example embodiments of the present invention have been described In the color calibration display apparatus, the color calibration display method using the same, and the switchable display system including the color calibration display apparatus according to the example embodiments of the present invention, through a command for receiving a target color temperature for expressing a certain color of a projected image from a user, a command for obtaining color temperature coordinates for each color constituting the target color temperature using a color coordinate system, a command for measuring illuminance for each color according to ambient external light using an illuminance sensor including a color filter, a command for obtaining color space coordinates from the illuminance for each color using a color matching function, a command for comparing the color temperature coordinates and the color space coordinates for each color to calculate a color calibration value, and a command for reflecting the color calibration value in the illuminance for each color to calibrate a color temperature disproportionately expressed by external light so as to be uniformly expressed, a color temperature of a display apparatus is controlled in consideration of the illuminance of an external environment, thereby providing a highly visible virtual reality or AR image with a color temperature and a color contrast value which are preset by a user.

In a color calibration display apparatus, a color calibration display method, and a switchable display system for providing virtual reality or AR reality using the color calibration display apparatus according to example embodiments, since commands are included, it is possible to provide an apparatus for adjusting the color calibration illuminance and color temperature of a display which correspond to an external environment and are measured using an illuminance sensor coupled to a color filter.

Through a secondary display, it is possible to provide a virtual reality/AR-switchable display by adjusting transmittance through an improvement in color accuracy and the maximization of an opening/closing rate of a display of a projection optical system for AR.

According to the present invention, it is possible to provide an apparatus for adjusting color calibration illuminance and color temperature in order to solve a color accuracy problem of a display of an existing projection optical system for AR.

According to the present invention, it is possible to provide an apparatus capable of constantly maintaining a color temperature desired by a user through an illuminance sensor combined with a color filter.

According to the present invention, it is possible to provide an improved projection optical system for AR to which a secondary display is coupled.

According to the present invention, it is possible to provide optimal display performance with improved color expression suitable for a current display environment using a secondary display whose transmittance is adjustable.

According to the present invention, it is possible to implement a new integrated display capable of switching between virtual reality and AR by maximizing transmittance and an opening/closing rate of a secondary display.

According to the present invention, it is possible to maintain constant color expression by compensating for a color imbalance of a display, which is degraded by external light, through a color temperature calibration algorithm.

The present invention can be applied to existing products through the development of a detachable secondary display.

According to the present invention, by using a software compensation device, the application of additional technologies and supplementation are easy.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

This research project was supported by the Sports Promotion Fund of Seoul Olympic Sports Promotion Foundation from the Ministry of Culture, Sports, and Tourism (the revolutionary athlete data integration technology for national football performance innovation).

What is claimed is:

1. A color calibration display apparatus, comprising:
a frame which is in a form of a helmet or goggles having a frame structure through which light is to enter in a state of being worn on a head of a user;
a display projector configured to output image light such that augmented reality image information is to be provided to the user on an optimized screen along with a transmitted and visible real world;
a projection optical system installed to be attached to one side of the frame and configured to generate and transmit an output augmented reality image signal to the display projector;
a controller configured to control brightness of an augmented reality image, which is to be viewed by being projected by the display projector, to be adjusted according to illuminance detected by an illuminance sensor;
a power supply configured to supply power for augmented reality driving of the color calibration display apparatus; and
a color calibration display configured to, when the image light generated by the display projector is projected onto the projection optical system and reflected by the projection optical system to enter eyes of the user, change color in response to an adjustment of an amount of light incident from an outside to recognize the augmented reality image information,
wherein the controller is configured to provide an optimized screen having optimized visibility simultaneously using a degree of a change in color of the color calibration display, which is configured to change color according to an amount of ultraviolet light, and an illuminance value detected by the illuminance sensor.

2. The color calibration display apparatus of claim 1, wherein the color calibration display further includes the illuminance sensor mounted in front of the frame on an optical path of the projection optical system and provided as at least one sensor for detecting external illuminance.

3. The color calibration display apparatus of claim 2, wherein the illuminance sensor is configured to detect and provide brightness of external light to the controller so that, when the controller provides the augmented reality image information, the illuminance sensor functions to allow the brightness of the external light to be used as auxiliary information for adjusting brightness of the augmented reality image.

4. The color calibration display apparatus of claim 1, further comprising a switch unit installed at one side of the frame or formed in a separate device connected to the frame in a wired manner and configured to function as a switch for turning the power supply on/off.

5. The color calibration display apparatus of claim 1, further comprising a microdisplay configured to, during the augmented reality driving, request augmented reality information processing with an image captured by a red- green-blue (RGB)-D camera in a line of sight of the user and geographic position information of a global positioning system (GPS).

6. The color calibration display apparatus of claim 1, further comprising a communication unit which is configured to perform data communication for performing an augmented reality information request and receiving augmented reality corresponding thereto through an Internet connection with an external augmented reality data server and to which a communication method through which the Internet is accessible is applied.

7. The color calibration display apparatus of claim 1, further comprising a microdisplay configured to provide the augmented reality image information to the display projector and receive augmented reality voice information from a voice signal generator.

8. The color calibration display apparatus of claim 1, wherein, based on the color calibration display, which is configured to change color in response to an amount of ultraviolet light, and the illuminance detected by the illuminance sensor which is configured to detect external illuminance, the controller is configured to control controls the augmented reality image information of the image light output through the display projector to be clearly provided to the user.

9. The color calibration display apparatus of claim 1, wherein the controller is configured to control a contrast value of the augmented reality image, which is to be viewed through the display projector, to be gradually adjusted according to an illuminance value detected by the illuminance sensor.

10. The color calibration display apparatus of claim 1, wherein, during the augmented reality driving of the color calibration display apparatus, the controller is configured to request augmented reality image information corresponding to a user request for augmented reality information to an external augmented reality data server to receive and store the augmented reality image information in an internal memory, provide the augmented reality image information through the display projector, and execute an augmented reality application installed thereon.

11. The color calibration display apparatus of claim 1, wherein:
the color calibration display is a lens component which is disposed in front of both eyes of the user wearing the frame and allows a real world to be transmitted and seen through a field of view of the user; and
the color calibration display is provided as a see-through type transparent lens which is configured to change color due to a molecular arrangement of a lens material being actively changed when exposed to ultraviolet light in an outdoor area.

12. The color calibration display apparatus of claim 1, wherein the color calibration display is provided as photochromic glass in which transparency of a lens is to be changed step-by-step according to a preset amount of ultraviolet light and which includes a D-shine photochromic dye, which is a dye that is to change color according to an amount of ultraviolet light.

13. The color calibration display apparatus of claim 1, wherein the color calibration display is provided in a form of an active type lens in which a thin film made of a photochromic material is applied on glass made of a transparent material or plastic made of a polycarbonate material, or a photochromic substrate is inserted.

14. A color calibration display method for a color calibration display apparatus of claim 1, wherein the color calibration display method comprises:
receiving a target color temperature for expressing a specific color of a projected image from the user;
obtaining a color temperature for each color constituting the target color temperature using a color coordinate system;
obtaining color temperature coordinates for each color using the color coordinate system;
measuring illuminance for each color according to ambient external light using the illuminance sensor;
obtaining color space coordinates corresponding to the color coordinate system from the illuminance for each color using a color matching function;
comparing the color temperature coordinates and the color space coordinates for each color to calculate a color calibration value; and
reflecting the color calibration value in the illuminance for each color to calibrate a color temperature disproportionately expressed due to external light so as to be uniformly expressed.

15. The color calibration display method of claim 14, wherein the obtaining of the color temperature for each color constituting the target color temperature using the color coordinate system includes measuring, by the color calibration display, a color temperature value corresponding to a measured illuminance value for each color based on a CIE 1931-based color coordinate system.

16. The color calibration display method of claim 14, wherein the color coordinate system refers to a coordinate graph in which, based on information about color perception of humans, a color expression power of a display apparatus is expressed as a Maxwell's color triangle using a tristimulus value, a color matching function, and a chromaticity distribution table.

17. The color calibration display method of claim 14, wherein the color calibration display method uses an inverse-super twisted nematic (STN) guest-host liquid crystal method which is a method in which characteristics of a display vary according to a doping concentration of a dichroic dye, in order for the color calibration display which is a secondary display whose transmittance is variable according to an applied voltage.

18. The color calibration display method of claim 14, wherein the color calibration display method uses a method in which, in an initial state without an applied voltage, a liquid crystal and a dichroic dye are aligned in a vertical direction to maintain a transparent state in which light is transmitted without any change, and light incident from an external light source is decreased using an opening/closing rate of a display being lowered due to rotation of an orientation state of the liquid crystal and the dichroic dye when a voltage is applied up to a driving voltage.

19. A switchable display system for providing virtual reality or augmented reality using a color calibration display apparatus, the switchable display system comprising:
an augmented reality data server configured to provide virtual reality and augmented reality information; and
a color calibration display apparatus of claim 1.

* * * * *